Feb. 17, 1970    A. SALLOW    3,496,312
PROGRAM CONTROL MEANS FOR A MEMEBER TURNING ABOUT AN AXIS
Filed April 26, 1967    2 Sheets-Sheet 1

INVENTOR.
AKE SALLOW
BY
Bailey, Stephens + Huttig

Feb. 17, 1970  A. SALLOW  3,496,312
PROGRAM CONTROL MEANS FOR A MEMEBER TURNING ABOUT AN AXIS
Filed April 26, 1967  2 Sheets-Sheet 2

INVENTOR.
AKE SALLOW
BY

United States Patent Office 3,496,312
Patented Feb. 17, 1970

3,496,312
PROGRAM CONTROL MEANS FOR A MEMBER TURNING ABOUT AN AXIS
Ake Sallow, Vasteras, Sweden, assignor to Allmanna Svenska Elektriska Aktiebolaget, Vasteras, Sweden, a Swedish corporation
Filed Apr. 26, 1967, Ser. No. 633,887
Claims priority, application Sweden, May 10, 1966, 6,378/66
Int. Cl. H01h 3/42
U.S. Cl. 200—18        4 Claims

ABSTRACT OF THE DISCLOSURE

A program control means for a member turning about an axis has an ingoing shaft connected to the member to turn in unison with it and two output shafts connected to the ingoing shafts to turn in unison with it in opposite directions. A cam shaft for controlling a number of switches is mounted in a turntable frame so that, by turning the frame, the cam shaft can be brought into connection with either of the ingoing shafts.

FIELD OF THE INVENTION

The present invention relates to a program control means for devices turnable about one axis within several quadrants.

THE PRIOR ART

Program controlling is a technique which has been used for a long time within various fields and has become of increasing importance with the demands for automation, for instance within the industrial processing technique, handling of material and goods, communications, etc. Increased independence of manual labour is desired without the equipment becoming too complicated with resultant risks of faults arising.

For example when handling goods, for instance by crane, it is desired to avoid uneconomical and sometimes dangerous paths of movement and speeds of the goods. A program control for cranes with means for luffing and swinging loaded cranes is known, the operation means being included in a program means to simultaneously control a motor for swinging and a motor for luffing the loaded cranes in which the speeds of the two motors are co-ordinated so that the load is moved in a substantially straight line between the two hoisting positions above the starting and finishing positions of the load. This device is a considerable step forward towards obtaining rational and economical handling of goods without risk in this particular field.

However, with such turning movements, and even with other devices turnable within several sectors, it is desirable to be able to choose a certain quadrant or sector for the program controlled movement and obtain a simple, but at the same time safe, device for such programmed movement. This is the case for other turnable devices as well as cranes.

SUMMARY OF THE INVENTION

A device solving these and other similar problems is the object of the present invention and is characterised in that it comprises at least one ingoing shaft connected to a turning part and at least two outgoing shafts to which a transducer system with a contact device can be alternatively connected, the outgoing shafts being so connected to the ingoing shaft that they are turned with or in the opposite direction to the movement direction of the ingoing shaft.

The contact devices may consist of electrical contacts, hydraulic, pneumatic or mechanical contacts, valves or influencing means.

Such a program device makes it possible to rapidly switch over between movements in different quadrants or sectors. It provides great flexibility in the choice of programming purpose and programs and, due to its simplicity and possibilities of extension or enlargement, it has great technical advantages.

BRIEF DESCRIPTION OF THE DRAWINGS

The program control means is more clearly explained in the accompanying drawings where.

DESCRIPTION OF THE PREFERRED EMBODIMENTS

Figure 1:
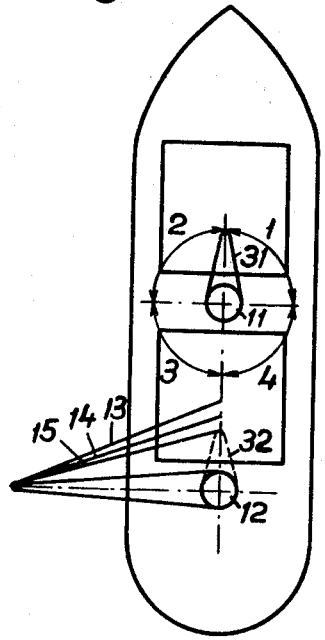
FIGURE 1 shows its principal application in a ships crane, FIGURE 2 a program means seen from the side, FIGURE 3 a cam disc in this means and FIGURE 4 two outgoing shafts in this device.

FIGURE 1 shows a ship with two cranes 11 and 12, both of which may be program controlled (see the above description of the known art). Depending on where the vessel lies in relation to the loading position on the quay it is desirable to be able to choose the quadrant (1, 2, 3 or 4, see FIGURE 1) or sector (comprising also angles other than 90°), within which the movement is to take place. After manually controlled hoisting of the load from the hold, the programmed movement can take place along a straight line 13, 14 or 15 or along a desired curve. The program device is in this case used to control the combined swinging and luffing movement while the load is being moved across the ship to the quay (barge, lighter) or vice versa.

It is extremely important that the crane is used to its full capacity and even for experienced crane operators program controlling has considerable advantages, particularly when the crane is operating frequently with a small swinging radius above the hold. It is desirable to avoid swinging of the load, collisions between the two cranes, etc. The program controlling is most easily switched in by a pedal, for example (not shown). It can be used for both electrically and hydraulically operated cranes and other means of transport.

Figure 2:
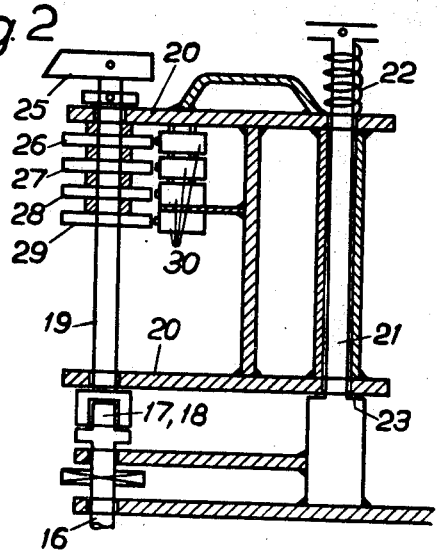
Figure 3:
Figure 4:
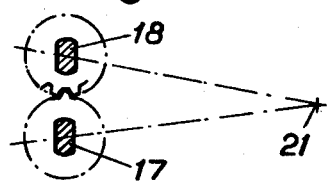

In FIGURE 2 is shown a programme control means according to the invention. It is provided with an ingoing shaft 16 suitably (as by a bendable or pivoted shaft, gearing, belt drive, etc.) connected to the turning shaft of the crane or transport means and alternatively connectable to each of at least two outgoing shafts 17, 18 (FIGURE 2). The figure shows the directly connected shaft 17, whereas the shaft 18 is hidden. The mutual arrangement of the shafts 17 and 18 is clear from FIGURE 4. One of these (17) is directly connected to the shaft 16 (see FIGURE 1) and rotates in the same direction as shaft 16. The other is connected by means of a gearing or a selsyn to the shaft 17 or the shaft 16 and rotates in the opposite direction from shaft 16. The turning movement may also be transmitted from the crane to the program device by means of a selsyn device and the turning direction may be changed by means of phase shifting.

The device is provided with a turning shaft 19 intended to be connected to the shaft 17 or 18 and after connection, to rotate with this shaft (FIGURE 2). The turning shaft 19 is axially displaceable so that it can be disconnected from its driving shaft and moved to another driving position. It is turnably mounted in a frame 20, movable about a central shaft 21 (see also FIGURE 4). The frame 20 is held by means of a spring 22 against a stop 23 in the central shaft 21.

The turning shaft 19 can also be turned a certain angle, for example 180°, after having been moved upwards by a handle 25, and connected to the same or another driving shaft 17 or 18.

Cam discs 26–29 are attached about the shaft 19 and can be locked to the shaft 19 in the desired turning position and given the desired shape depending on the movement program. During their turning movements the cam discs, which may be replaced by other influencing means, influence the contact device 30, electrical contacts, hydraulic pneumatic or mechanical valves or other combinations which in turn effect the desired movement, for example connect the respective motor with a certain speed for luffing or swinging movements of the crane arm 31 or 32, FIGURE 1.

As is seen from FIGURE 2 the device can be extended and easily arranged for different desired programs.

If a quadrant (such as 1) is to be chosen, the turning shaft 19 is connected, for example to the outgoing shaft 17 when a certain turning position has been set by the handle 25. If the handle is turned 180° between connection to the shaft 17 the desired program is instead obtained for quadrant 3. If in the first turning position the shaft 19 is connected to the shaft 18 the quadrant 2 is obtained and after turning the handle 25 180°, the quadrant 4. Of course the direction of rotation for the swinging motor (not shown) must be adjusted by separate means not shown.

Figure 5:
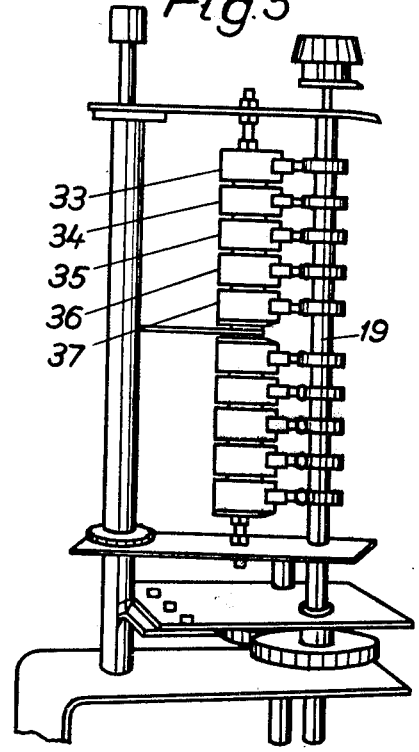
FIGURE 5 shows a perspective view of the means.

The means described above can be used for all devices turnable about a shaft for movement within different sectors and when programming of these movements is required. FIGURE 5 shows in perspective a device with five upper electrical contacts 33–37 influenced by cam discs in various turning positions, which are attached to the turning shaft 19. These contacts control the movement for the luffing motor of a ships crane (and may be complemented by timing devices). The lower contacts are also influenced by the cam disc and control the swinging motor for this crane. They can also be complemented by timing devices, limit breakers and other control devices.

Figure 6:
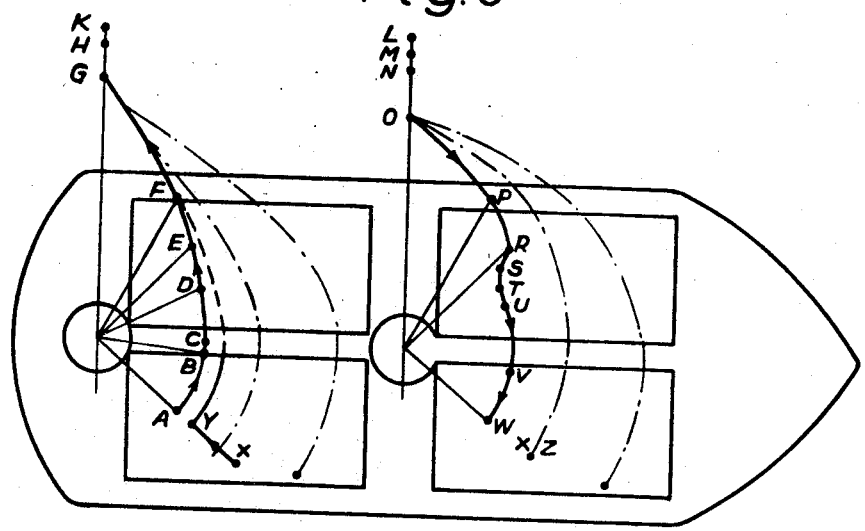
FIGURE 6 shows different programs for ships cranes and FIGURE 7 shows an alternative cam disc device used in a vessel according to FIGURE 6.
Figure 7:
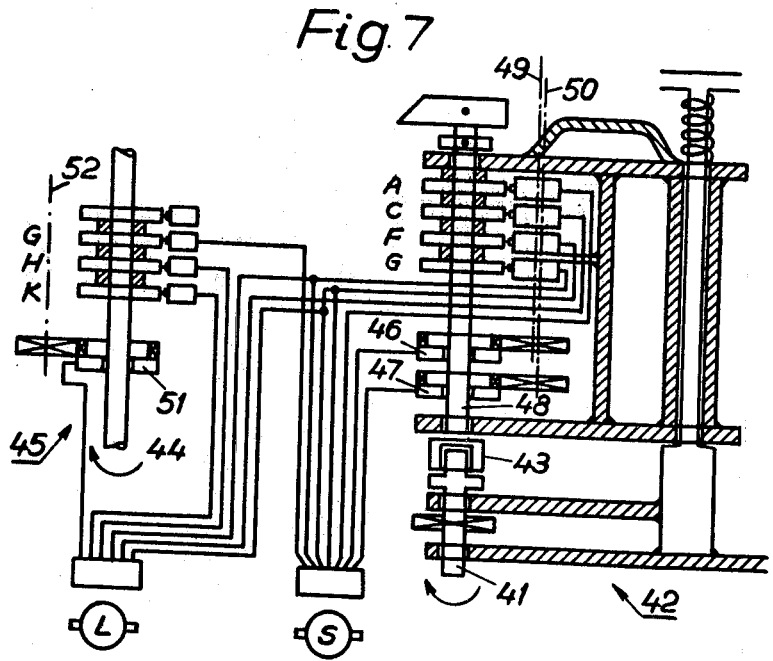

FIGURE 6 shows a programmed load path on a ship in FIGURE 7 shows in principle the path control. At point A (FIGURE 6) the swinging is started to full speed for the swinging motor S (FIGURE 7). At B a special switch means, not shown, for the luffing motor L is connected. The program device 42 for swinging is driven at the arrow by the swinging movement and can be altered between movements in different quadrants or working sectors. Changing of the motor speeds can be carried out intermittently or continuously, possibly with a time delay. The device 42 can be lifted out of the connection 43 and turned to a different connection position and the opposite turning direction is then obtained. At position C the luffing motor L is started by means of the cam disc C and its contact device, and the speed of the luffing motor L is increased and at F the swinging motor is retarded. At G the swinging movement is stopped and the luffing movement possibly accelerated, to be subsequently retarded in position H and stopped in position K.

Control of the electric swinging and luffing motors is carried out by means of cam discs and electric contacts, but may also be done by means of hydraulic valves, etc. The motors S and L may also be hydraulic.

The program device 45 for luffing is controlled by the luffing movement (arrow 44) and as can be seen, this program device 45 in certain positions influences the swinging motor S, just as the program device 42 for the swinging in certain positions influences the luffing motor L.

It is also possible to have certain rapid setting positions in these program devices for both luffing and swinging, so that it is possible to rapidly adjust to other desired end positions and/or paths of movement for the load. FIGURE 7 shows two such setting devices at 42 (the number may be chosen arbitrarily). Two cam discs 46, 47 are frictionally mounted on the shaft 48 of the program device 42 and by means of turning rods 49, 50, can be set by suitable end or intermediate positions through the gears. For example the crane can be driven to a certain desired position without using the program device, after which the rods 49, 50 are turned to the same position which may be indicated by means of lamps or the like), thus setting a programmed end position. In this case the newly set path is followed when the program device is connected. The program device 45 can be similarly adjusted by adjusting cam disc 51 through its rod 52'. It is possible to program several alternative load paths by means of several connection members placed parallel or in series with the same or another cam disc. The choice of load path may be made by a simple connection device at the operating place. See the dotted lines which show alternative load paths which can be connected in by means of switches.

If the operating radius is exceeded, for example to position X, luffing can be started at this position by means of cam discs (for example 46 or 47) to position Y where the luffing motor is stopped and swinging to the left starts. The dotted line is then followed during continued driving to the left. Program driving may then be continued to position Z which has been set as described above.

When swinging in from position L for the first crane (FIGURE 6), luffing is started in a corresponding manner at position L and the luffing movement is accelerated in positions M and N, for example by timing or cam control. At position O the swinging is started (by the program device 45) and thus the movement is controlled by both the program devices 42 and 45 to the position T where it is stopped and possibly reversed, or continues, for example to position W through the positions U and V.

By arranging separate controls for manual and automatic driving, the movement can be started and stopped at any chosen position along the whole path. Similarly, by introducing manual driving, the movement can be changed at any position along the way.

Instead of switches or cam discs, some suitable type of magnetic memory for a data machine can be used and the program is recorded on this memory which cooperates with suitable sensing means.

The device can be varied in many ways within the scope of the following claims.

I claim:

1. Program control means for a device turnable about an axis comprising a base part, a first rotatable member comprising an ingoing shaft mounted in the base part and connected to the device to be driven thereby, a frame part mounted for turning about an axis with respect to the base part, a second rotatable member constituting a program control member turnably mounted in said frame part, and means for connecting the program control member to the ingoing shaft for movement thereby in either direction, said connecting means comprising a pair of outgoing shafts and means connecting said shafts to turn in opposite directions, said outgoing shafts being mounted in one of said parts, a first of said outgoing shafts being connected to one of said rotatable members to rotate therewith, and means for selectively connecting the outgoing shafts to the other of said rotatable members upon relative turning movement between said base part and said frame part.

2. Program control means as claimed in claim 1, in which said outgoing shafts are mounted in said frame part, and all of said shafts are parallel to said axis.

3. Program control means as claimed in claim 1, in which the means connecting the outgoing shafts is constituted by gears on the shafts.

4. Program control device as claimed in claim 1, in which said program control member comprises electric contact device operating members, said first outgoing shaft being connected to said ingoing shaft, and said selective connecting means including means for connecting the program control member to the outgoing shafts in a plurality of angular positions with respect thereto.

References Cited

UNITED STATES PATENTS

| | | |
|---|---|---|
| Re. 25,654 | 10/1964 | Kleinschmidt et al. |
| 2,540,222 | 2/1951 | Tilton _____ 200—31 X |
| 3,247,334 | 4/1966 | Sebring _____ 200—25 X |

FOREIGN PATENTS 1,065,152   4/1956   Germany.

OTHER REFERENCES

South Bend Lathe Works: 9-inch Workshop Bench Lathe Manual, 1935, p. 6.

ROBERT K. SCHAEFER, Primary Examiner

ROBERT A. VANDERHYE, Assistant Examiner

U.S. Cl. X.R.

200—25, 153